United States Patent [19]
Rizzuto et al.

[11] Patent Number: 5,473,972
[45] Date of Patent: Dec. 12, 1995

[54] MILK CONTAINER ATTACHMENT FOR CAPPUCINO MAKER

[75] Inventors: Leandro P. Rizzuto, Greenwich; Theodore B. Mullé, Ridgefield, both of Conn.; Asik Braginsky, Forest Hills, N.Y.

[73] Assignee: Conair Corporation, Stamford, Conn.

[21] Appl. No.: 327,609

[22] Filed: Oct. 24, 1994

[51] Int. Cl.⁶ .................................................. A47J 31/40
[52] U.S. Cl. ........................... 99/290; 99/293; 99/300
[58] Field of Search ............................ 99/295, 290, 293, 99/294, 299, 300, 302 R, 316; 261/DIG. 16, DIG. 76

[56] References Cited

U.S. PATENT DOCUMENTS

| | | | |
|---|---|---|---|
| 4,800,805 | 1/1989 | Mahlich et al. | 99/293 |
| 4,921,640 | 5/1990 | Wu | 99/293 |
| 4,922,810 | 5/1990 | Siccardi | 99/293 |
| 5,265,520 | 11/1993 | Giuliano | 99/293 |
| 5,330,266 | 7/1994 | Stubas | 99/293 |
| 5,335,588 | 8/1994 | Mahlich | 99/293 |
| 5,339,725 | 8/1994 | De'Longhi | 99/293 |

Primary Examiner—David Scherbel
Assistant Examiner—Tony G. Soohoo
Attorney, Agent, or Firm—Haynes N. Johnson

[57] ABSTRACT

A separate, removable milk container is provided which can be attached to and detached from a cappucino coffee maker. Alternatively, it can be attached to a modified espresso maker, converting it to making cappucino. The container has make and break connections for a milk delivery tube, so that, when the unit is not in use, the milk container can be removed from the unit and stored in a refrigerator to prevent spoiling of the milk. The cappucino maker includes a steam line to heat the coffee and milk. This line runs through a venturi, drawing milk into it, and then forces the steamed and frothed milk to a steamed milk outlet proximate to the coffee dispensing spout. The separate milk container includes means for attaching it to the unit and a milk tube which runs to the venturi. Thus, in use, the venturi draws milk from the container into the steam line and to the frothed milk outlet.

5 Claims, 3 Drawing Sheets ized with the milk container.

MILK CONTAINER ATTACHMENT FOR CAPPUCINO MAKER

FIELD OF THE INVENTION

This invention relates to the field of cappucino coffee makers, and, in particular, to ones having a milk container which is removable for storage and to ones having a milk spout proximate to the coffee spout. The invention can also be used to modify existing espresso makers so that they can make cappucino coffee.

BACKGROUND OF THE INVENTION

Cappucino makers have, in the past, had problems in their use: the milk container has been a part of the maker itself, meaning that, when the unit is not to be used for a period, the milk must be removed and the unit cleaned; and, also, the spout for dispensing hot, frothy milk has been at a different location from the spout for dispensing coffee, requiring that the cup be repositioned. The present invention solves these problems.

BRIEF SUMMARY OF THE INVENTION

Our invention utilizes a separate, removable milk container which can be attached and detached from a cappucino coffee maker. Alternatively, it can be attached to a modified espresso maker, converting it to making cappucino. The container has make and break connections for a milk delivery tube, so that, when the unit is not in use, the milk container can be removed from the unit and stored in a refrigerator to prevent spoiling of the milk.

The cappucino maker includes a steam line to heat the coffee and milk. This line runs through a venturi, drawing milk into it, and then forces the steamed and frothed milk to a steamed milk outlet proximate to the coffee dispensing spout. The separate milk container includes means for attaching it to the unit and a milk tube which runs to the venturi. Thus, in use, the venturi draws milk from the container into the steam line and to the frothed milk outlet.

DETAILED DESCRIPTION OF THE INVENTION

Figure 1:
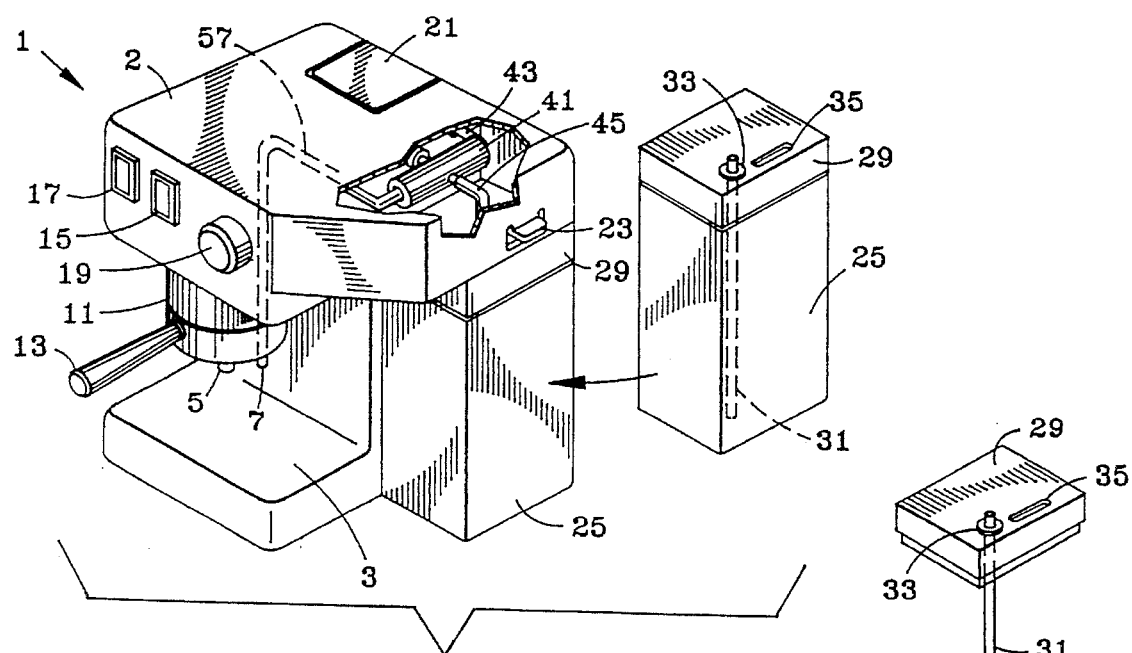
FIG. 1 is a perspective view of the cappucino maker, and shows the removable container both in its installed position and removed from the unit.
Figure 2:
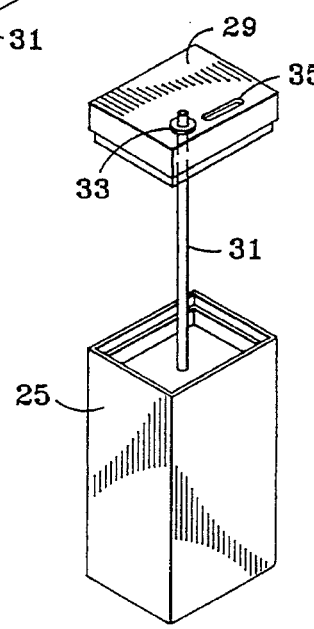
FIG. 2 is a perspective view of the milk container, with the top partially removed.
Figure 3:
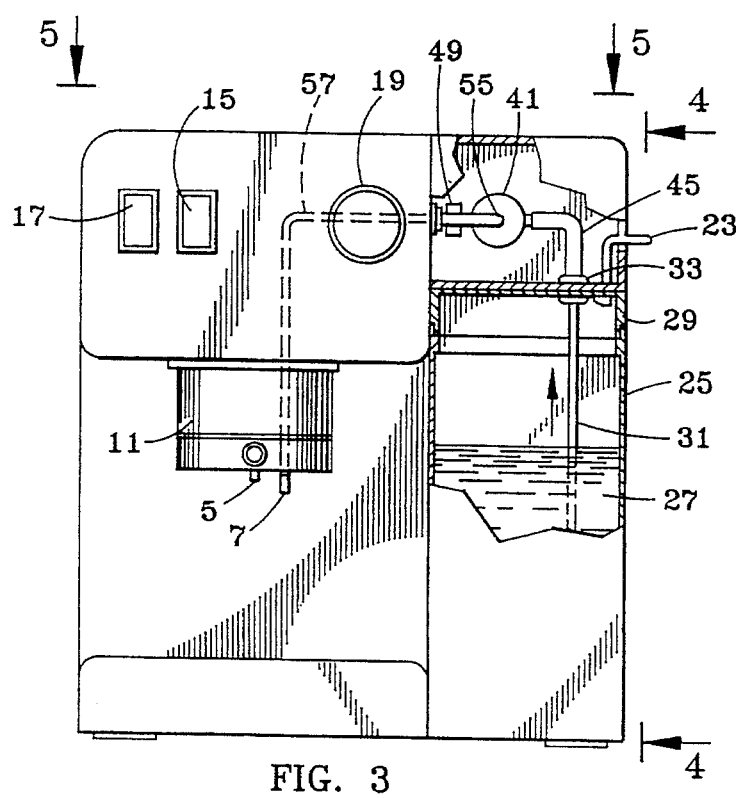
FIG. 3 is a front elevation of our cappucino maker, partly broken away.
Figure 4:
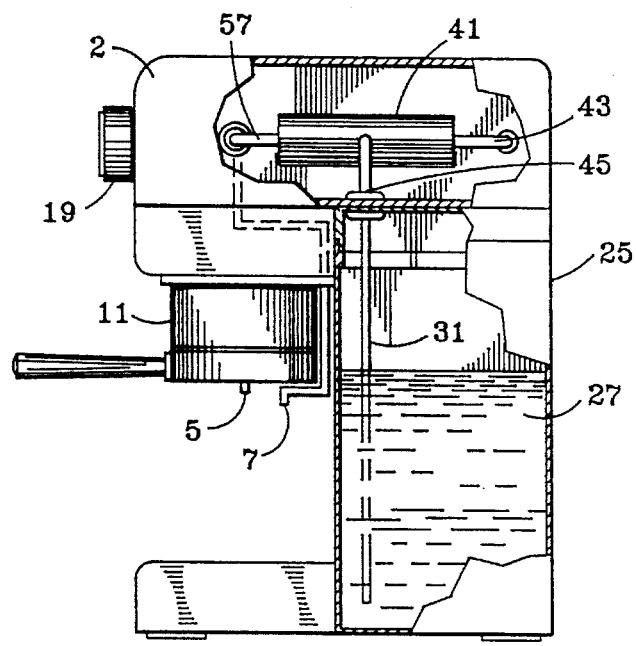
FIG. 4 is a side elevation, partially broken away, taken on line 4—4 of FIG. 3.
Figure 5:
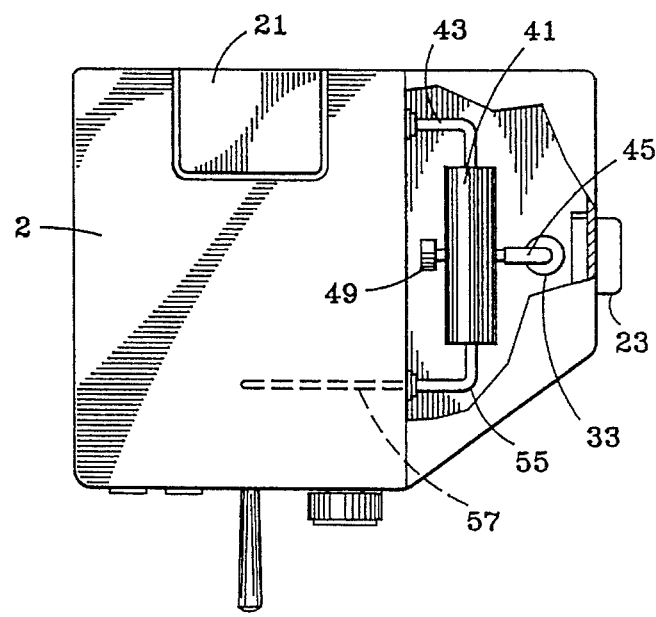
FIG. 5 is a top plan view, partially broken away, taken on line 4—4 of FIG. 3.
Figure 6:
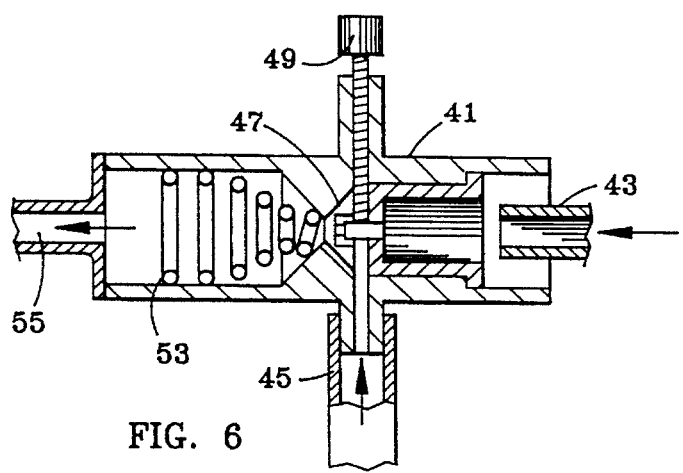
FIG. 6 is a vertical section, taken through the venturi, showing how the hot steam and milk are brought together and mixed.

Our cappucino maker 1 has the usual housing 2 and dispensing area 3. The dispensing area, however, includes two proximate dispensing spouts, a coffee (espresso) spout 5 and a steamed milk spout 7. The two spouts are close enough together so that both can be directed to a cappucino cup at the same time. The unit also includes a coffee basket 11 with handle 13, an on-off switch 15 with indicator light 17, a steam adjustment knob 19 and a water inlet 21. These work in the customary way.

Our cappucino maker includes the usual elements found in such a unit: a water supply coupled with heating means to produce steam; means to run the steam through ground coffee to produce espresso coffee; an outlet for the coffee; and means to run steam through milk to froth it. It differs, however, in that, inter alia, the milk supply can be removed from the unit when desired to store the milk. Also, in our modification, the steam line to the milk includes a make and break connection, with self-closing valves, so that the milk frothing unit can also be removed from the cappucino maker.

Cappucino maker 1 includes a milk container 25 carrying milk 27. Container 25 is secured to housing 2 by latch 23 and the latch-receiving slot 35 on container top 29. A milk delivery tube 31 is carried by top 29 and extends down into container 25. It carries a seal 33 at its upper end. The tube 31 is to deliver milk to a venturi frothing unit.

A venturi 41 is carried by the housing 2 and mounted just above milk container 25. It acts as a milk frothing unit and has a steam inlet 43, to receive hot steam from the housing. The steam enters one end of the venturi 41, passes through a narrow aspirating portion 47, and leaves past a conical spring 53 (to assist in frothing the milk) to frothed milk outlet 55. Milk delivery tube 31 passes through spring-loaded seal 33 to its connection with milk inlet 45 on venturi 41. This leads milk to the narrow portion 47 of the venturi, the narrow portion acting as an aspirator as is customary with venturis. The milk mixes with steam in the narrow portion, frothing it, and the milk and steam pass towards frothed milk outlet 55. Conical spring 53 is encountered during that passage, which serves to further froth the milk. If desired, a froth control, such as a needle valve, can be positioned in the narrow portion 47 of venturi 41, to control the rate of flow of steam through the venturi.

The frothed milk goes from outlet 55 to and through tube 57, which leads to milk spout 7. This milk spout is positioned proximate to coffee spout 5, thus providing convenience in serving the cappucino. Preferably spouts 5 and 7 are close enough together so that both coffee and steamed milk can be delivered to a cup without moving the cup.

When one is finished using the cappucino maker, the milk container 25 can be removed from the unit by releasing latch 23. The container can them be placed in a refrigerator to preserve the milk. At the next time of use, the container can again be attached to the unit, with milk take up tube 31 connecting to the venturi milk inlet through seal 33. In the interim, the milk has been preserved from spoiling.

Figure 7:
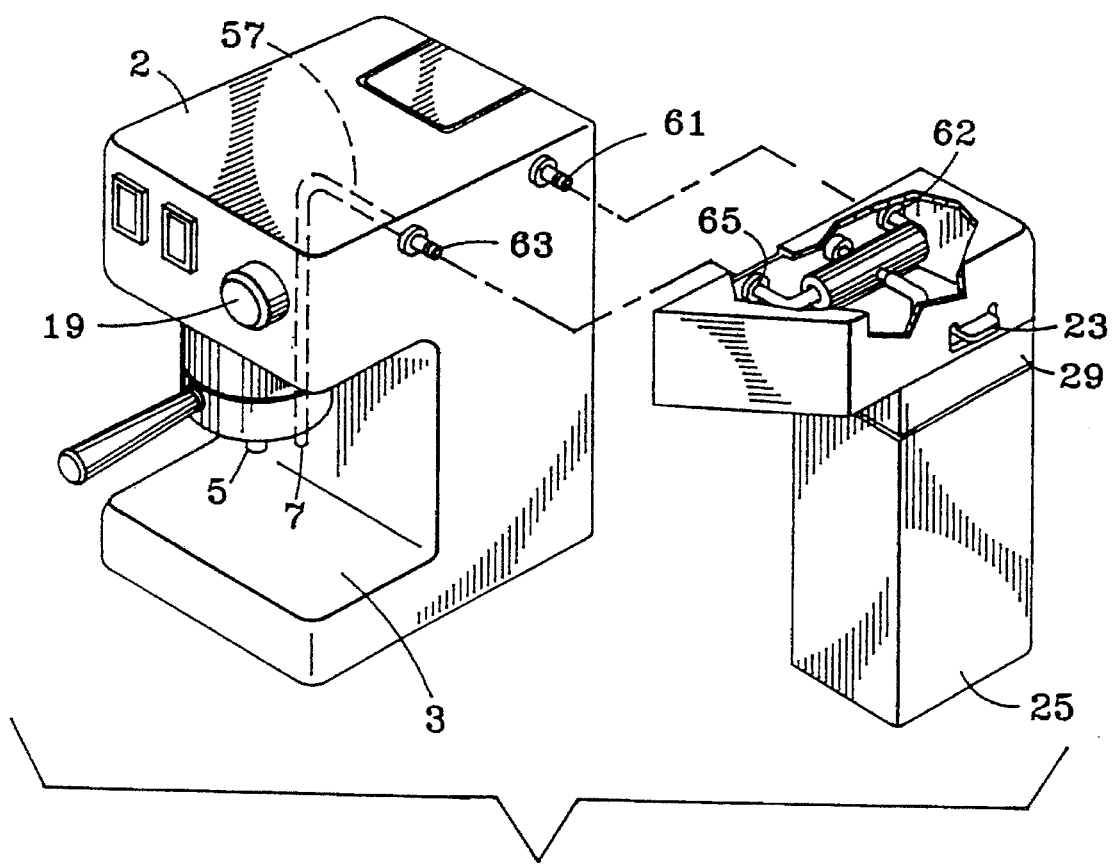
FIG. 7 is a an exploded perspective view of a modification of our invention in which the venturi frothing unit, together with the milk container, are detachable from the cappucino maker.

In a modification of our invention seen in FIG. 7, the milk container 25 and the venturi unit are detachable as a unit. In this instance, steam line 61 in the housing is connected to steam connection 62 on the venturi system; and frothed milk connector 63 in the housing is connected to milk connection 65 on the venturi system. These connections are preferably of the quick-acting and self-closing type.

It will be appreciated that our invention, particularly as shown in FIG. 7, can be used to modify existing espresso makers so that they can make cappucino. This would be accomplished by providing means for the espresso maker steam line to also be used to steam and froth milk, and by providing means by which this steam can be interconnected to a venturi frothing unit.

We claim:

1. In a cappucino maker having a housing, a steam source, means for steaming coffee using steam from said steam source, a coffee dispensing spout for dispensing said steamed coffee, and a frothed milk dispensing spout, that improvement including a milk frothing unit, said milk frothing unit including a venturi having a steam connection for receiving steam from said steam source, a narrow aspirating portion, and a frothed milk delivery portion, a milk container, latch means detachably securing said milk container to said housing, a milk delivery tube attached to said milk container and positioned to receive milk from said milk container and to deliver it to said narrow aspirating portion, and means interconnecting said frothed milk delivery portion and said frothed milk dispensing spout, whereby milk can be kept in a milk container which can be separated from said housing so that the milk can be stored under refrigeration.

2. In a cappucino maker as set forth in claim 1, that improvement in which said latch means connects with said narrow aspirating portion.

3. In a cappucino maker as set forth in claim 2, that improvement including sealing means for detachably interconnecting said milk delivery tube and said narrow aspirating portion.

4. In a cappucino maker as set forth in claim 1, that improvement including securing means securing said milk frothing unit to said milk container whereby said milk frothing unit is detached from said housing when said milk container is detached from said housing.

5. A detachable milk unit for use in a cappucino maker, said cappucino maker having a housing and a milk frothing device in said housing, said unit including a milk container, latch means for detachably securing said milk container to said housing, a milk delivery tube in said milk container, said milk delivery tube being positioned to carry milk from said milk container, and sealing means for detachably securing said milk delivery tube to said milk frothing section, whereby milk can be kept in a milk container which can be separated from said housing so that the milk can be stored under refrigeration.

* * * * *